United States Patent
Levkovitch et al.

(10) Patent No.: US 10,160,549 B2
(45) Date of Patent: Dec. 25, 2018

(54) ICE DETECTING APPARATUS

(71) Applicant: Israel Aerospace Industries Ltd., Lod (IL)

(72) Inventors: Michael Levkovitch, Rishon LeZion (IL); Yehuda Kalman, Shoham (IL); Maayan Dermer, Magshimim (IL); Michaela Alon, Rishon LeZion (IL); Nachum Levi, Shoham (IL); Dov Davidor, Ramat Hasharon (IL); Evgeny Vadrovnik, Ashdod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 182 days.

(21) Appl. No.: 15/113,358

(22) PCT Filed: Jan. 27, 2015

(86) PCT No.: PCT/IL2015/050096
§ 371 (c)(1),
(2) Date: Jul. 21, 2016

(87) PCT Pub. No.: WO2015/114624
PCT Pub. Date: Aug. 6, 2015

(65) Prior Publication Data
US 2017/0021934 A1    Jan. 26, 2017

(30) Foreign Application Priority Data
Jan. 29, 2014 (IL) .......................................... 230706

(51) Int. Cl.
*B64D 15/20* (2006.01)
*B64D 15/16* (2006.01)

(52) U.S. Cl.
CPC ............. *B64D 15/20* (2013.01); *B64D 15/16* (2013.01)

(58) Field of Classification Search
CPC ........ B64D 15/20; B64D 15/16; B64D 15/22; B64D 15/00; B64D 2033/0233; B64D 15/08
See application file for complete search history.

(56) References Cited

U.S. PATENT DOCUMENTS

| | | | |
|---|---|---|---|
| 2,427,778 A * | 9/1947 | Gregg | B64D 15/20 244/134 F |
| 2,803,813 A * | 8/1957 | Bullen et al. | B64D 15/20 200/61.5 |
| 2,901,741 A | 8/1959 | Moore et al. | |
| 3,996,787 A | 12/1976 | Edgington | |

(Continued)

FOREIGN PATENT DOCUMENTS

EP    2774851    9/2014

OTHER PUBLICATIONS

International Search Report and Written Opinion for International Application No. PCT/IL2015/050096 dated May 14, 2015.

*Primary Examiner* — Assres H Woldemaryam
(74) *Attorney, Agent, or Firm* — Dorsey & Whitney LLP

(57) ABSTRACT

An ice detecting apparatus comprising: a body including at least one ice detector mounted thereon and having an ice detecting surface and a scraping member so mounted relative to said body as to allow their movement one relative to the other and configured for scraping ice from said detecting surface during said movement.

16 Claims, 8 Drawing Sheets

(56) References Cited

U.S. PATENT DOCUMENTS

| | | | | |
|---|---|---|---|---|
| 4,210,021 A * | 7/1980 | Vykhodtsev | ........... | B64D 15/20 340/580 |
| 4,873,510 A * | 10/1989 | Khurgin | ................ | B64D 15/20 340/580 |
| 4,882,574 A * | 11/1989 | Khurgin | ................ | B64D 15/20 340/580 |
| 5,484,121 A * | 1/1996 | Padawer | ................ | B64D 15/20 244/134 F |
| 5,596,320 A * | 1/1997 | Barnes | ................. | B64D 15/20 250/574 |
| 5,760,711 A * | 6/1998 | Burns | .................. | B64D 15/20 340/583 |
| 6,010,095 A * | 1/2000 | Hackmeister | ........ | B64D 15/20 244/134 F |
| 6,052,056 A * | 4/2000 | Burns | .................. | B64D 15/20 250/573 |
| 6,419,186 B1 * | 7/2002 | Bachinski | ............ | B64D 43/02 244/17.11 |
| 6,759,962 B2 * | 7/2004 | Severson | .............. | B64D 15/20 340/580 |
| 8,624,738 B2 * | 1/2014 | Savarese | .............. | A63B 57/00 340/539.1 |
| 2004/0231410 A1 * | 11/2004 | Bernard | ................ | B64D 15/20 73/170.26 |
| 2008/0257033 A1 * | 10/2008 | Roberts | ................ | B64D 15/20 73/170.26 |

* cited by examiner

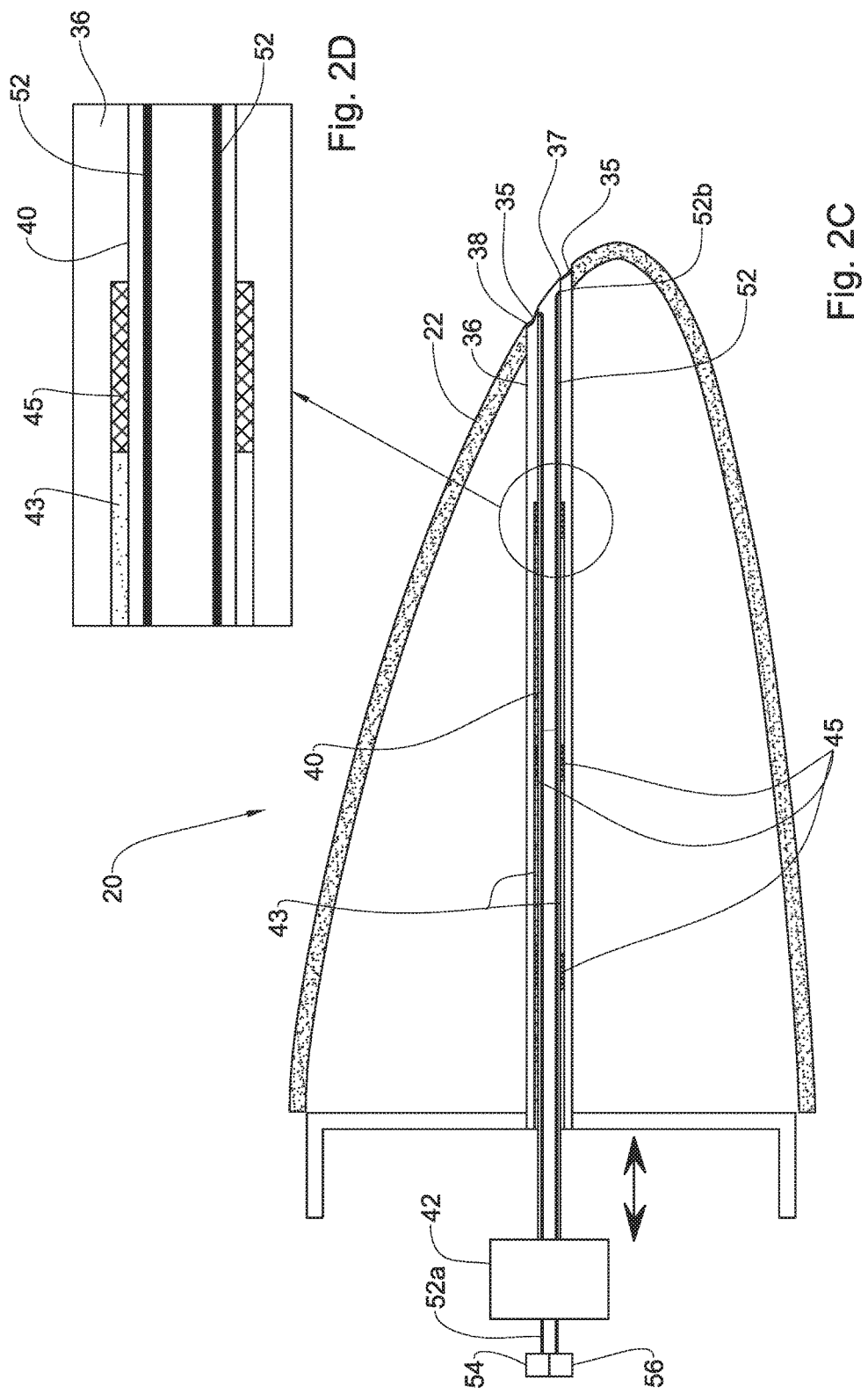

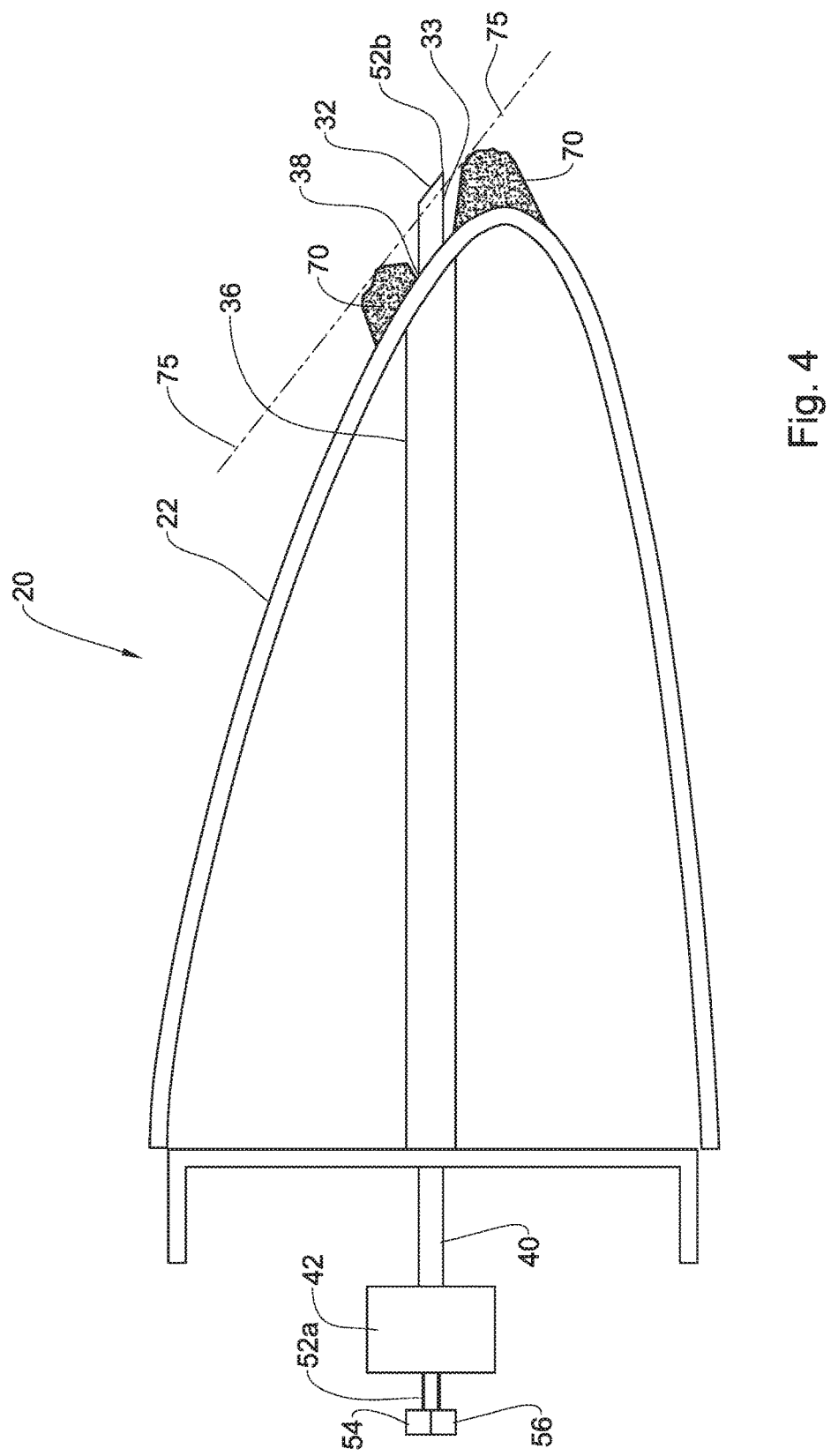

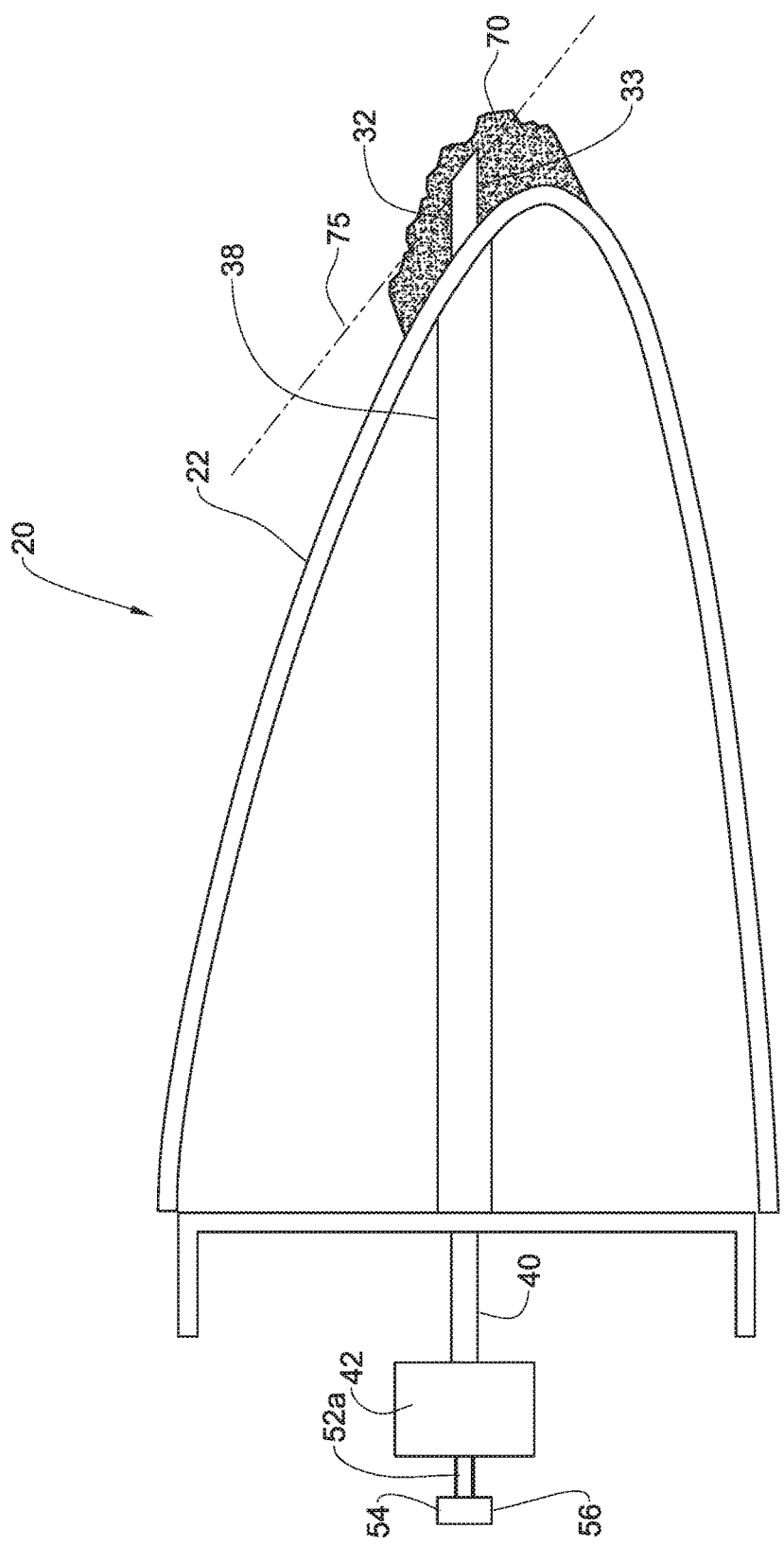

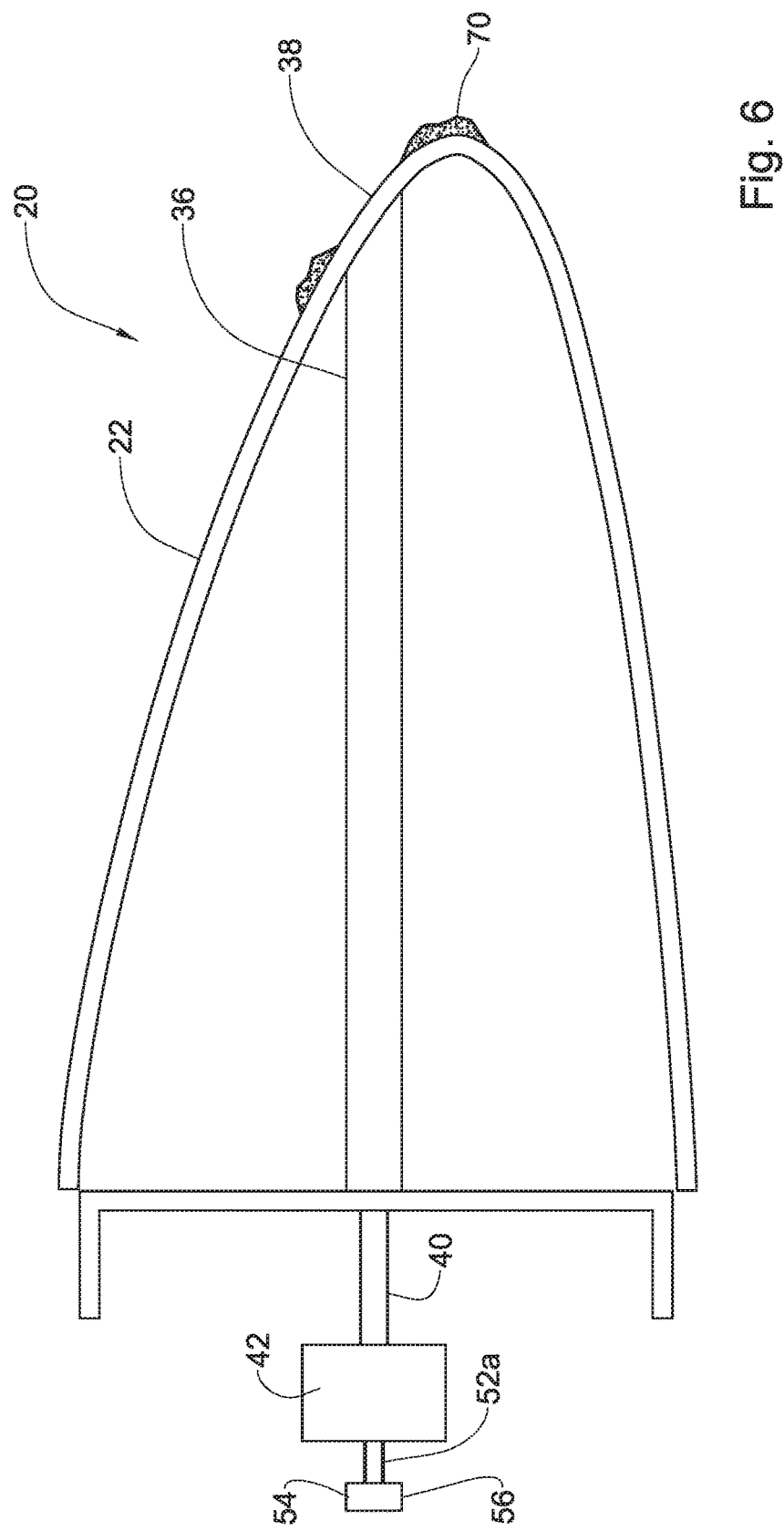

ICE DETECTING APPARATUS

TECHNOLOGICAL FIELD

The presently disclosed subject matter relates to an ice detecting apparatus in general, and in particular to an ice detecting apparatus for aircrafts.

BACKGROUND

When an aircraft flies in cold, moist air, especially at low altitudes, ice can form rapidly, both on and behind the leading edge of the wing and other portion of the aircraft. Presence of ice can disturb the airflow and can radically alter the lift of the wings and the center of gravity of the aircraft. hence the handling characteristics thereof. This phenomenon has caused a number of fatal accidents and loss-of-control events. In order to alert the pilot or the aircraft operator, of the present of ice, one or more ice detectors are mounted on the wing and/or on the fuselage, and configured to indicate when ice is accumulating thereon. As a response the pilot can direct the aircraft away from the zone in which the ice is likely formed. FIG. 1 shows a prior art ice detector 10 mounted on a wing 8 of an aircraft 5. The ice detector 10 is configured to detect accumulation of ice on the wing 8. According to some examples the ice detector can be thermostat configured to detect the temperature thereon. According to other examples the ice detector can be an optical device configured to detect accumulation of ice, for instance, by detecting a change in refractive index. According to other examples, the detector can be an acoustic detector which is configured to detect changes in the sound wavelength when icing occurs. According to a further example the ice detector can include a radioactive source and a sensor for detecting the radioactive emission. The ice detector can detect changes in emission level when icing occurs between the radioactive source and the sensor.

GENERAL DESCRIPTION

According to an aspect of the presently disclosed subject matter there is provided an ice detecting apparatus comprising a body including at least one ice detector mounted thereon and having an ice detecting surface and a scraping member so mounted relative to the body as to allow their movement one relative to the other and configured for scraping ice from the detecting surface during the movement.

The body can be an elongated rod wherein the ice detector can be mounted on a first end thereof, and wherein the rod can be coupled on a second end thereof to an actuator configured to allow a longitudinal displacement thereof. The rod can be mounted inside a channel and can be configured to be selectively displaced between a protruding position in which the ice detecting surface protrudes out of the channel, and a retracted position in which the ice detecting surface is disposed inside the channel.

Alternatively, the body can be mounted on a rod mounted inside a channel and being configured to be selectively displaced between a protruding position in which the ice detecting surface protrudes out of the channel, and a retracted position in which the ice detecting surface can be disposed inside the channel.

The channel can include at least one guide disposed therein and being configured to facilitate the displacement of the rod between the protruding position and the retracted position. The at least one guide can include a pad configured to facilitate sliding of the rod inside the channel.

The ice detecting surface can be a surface of the body having an ice detector mounted thereon. The ice detector can include at least one optical fiber coupled to a light source on a receiving end thereof and configured to transmit light emitted from the light source towards an emitting end thereof. The at least one optical fiber can be mounted inside a rod mounted inside a channel and being selectively displaceable between a protruding position in which the emitting end protrudes out of the channel and a retracted position in which the emitting end can be disposed inside the channel.

The light detector can further include a receiving optical fiber having a first end configured for receiving light and a second end coupled to a light sensor.

The emitting end can be further configured for receiving light reflected from objects disposed adjacent the light detector and wherein the optical fiber can be configured for transmitted the reflected light towards a light sensor coupled to the receiving end. The light source and the light sensor can be integrated in a module coupled to the receiving end.

The body includes a plurality of ice detectors mounted thereon. Each one of the ice detectors can be disposed at a different location along the length of the body.

The scraping member can be disposed at the opening of the channel and being configured for scraping ice from the detecting surface during displacement between the protruding position and the retracted position. The scraping member can be a ring-like member having sharpened portion defined on the inner periphery thereof, and being configured to engage the detecting surface and to remove ice therefrom during the movement.

The distance of protrusion of the ice detecting surface can be determined in accordance with the minimum thickness of the ice layer to be detected. The distance of protrusion can be automatically changed in accordance with the detection requirements.

Alternatively, the body can be a fixed with respect to the scraping member and wherein the scraping member can be movable relative to the body and can be so mounted relative thereto as to allow engaging the detecting surface during the movement.

According to another aspect of the presently disclosed subject matter there is provided an ice removing apparatus for removing ice from a detecting surface of an ice detector being mounted on a body, the apparatus comprising a scraping member so mounted relative to the body as to allow their movement one relative to the other and configured for scraping ice from the surface during the movement.

The scraping member includes a channel configured for receiving the body and wherein and opening portion of the channel can be being configured for scraping ice from the detecting surface during movement of the ice detecting surface therethrough.

The scraping member can be a ring-like member having sharpened portion defined on the inner periphery thereof, and being configured to engage the detecting surface and to remove ice therefrom during the movement.

The scraping member can be movable relative to the body and can be so mounted relative thereto as to allow engaging the detecting surface during the movement.

According to yet another aspect of the presently disclosed subject matter there is provided an element of an aircraft having an exterior surface susceptible to ice formation thereon, and having an ice detecting apparatus mounted thereon the apparatus comprising: a body including at least one ice detector mounted thereon and having an ice detecting surface and a scraping member so mounted relative to the body as to allow their movement one relative to the other and configured for scraping ice from the surface during the movement. The ice detector can be configured to detect ice accumulation on an outer surface of the exterior surface.

The element can further comprise a channel formed therein and having an opening defined on the exterior surface and wherein the body can be an elongated rod disposed in the channel and the ice detector can be mounted on a first end thereof, and wherein the rod can be coupled on a second end thereof to an actuator configured to allow a longitudinal displacement thereof. The channel can be a transversely defined in the element substantially in parallel to the traveling direction of the aircraft. The channel can include at least one guide disposed therein and being configured to facilitate the displacement of the rod between the protruding position and the retracted position. The element can be a wing portion or can be a fuselage portion.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2C illustrates a side sectional view of the wing portion of FIG. 2A taken along lines A-A;

FIG. 2D illustrates an enlarged view of the of rod of FIG. 2C;

FIG. 4 illustrates a side sectional view of the wing portion of FIG. 2A taken along lines B-B in the fully protruding position;

FIG. 5 illustrates a side sectional view of the wing portion of FIG. 2A taken along lines B-B in the fully protruding position having ice accumulated thereon; and FIG. 6 illustrates a side sectional view of the wing portion of FIG. 2A taken along lines B-B in the retracted position.

DETAILED DESCRIPTION OF EMBODIMENTS

Figure 1:
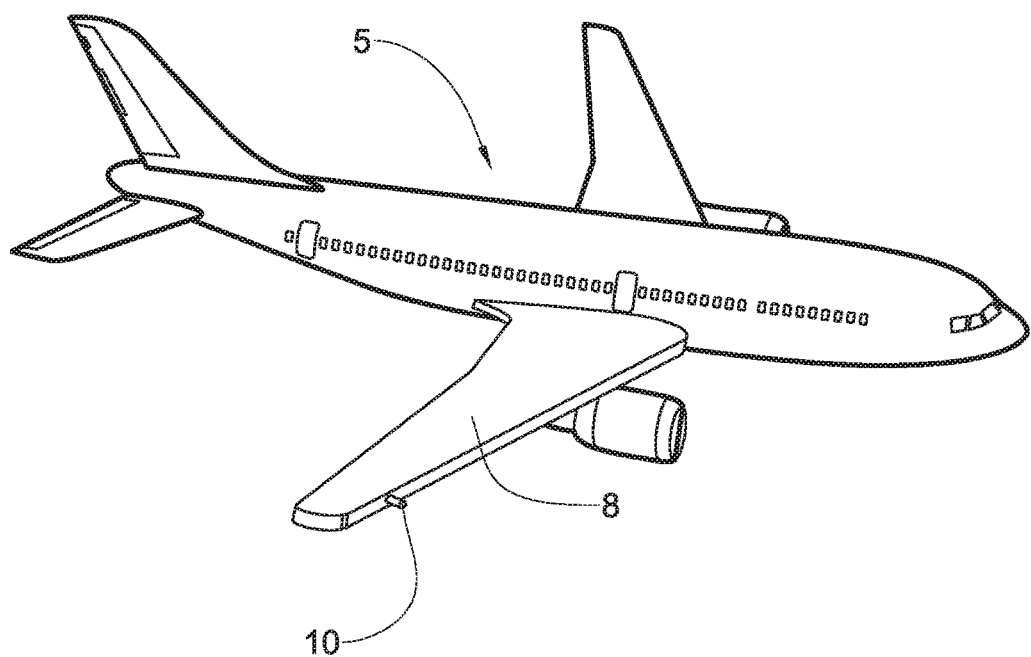
FIG. 1 illustrates an aircraft having a prior art ice detector mounted on the wing thereof.
Figure 2A:
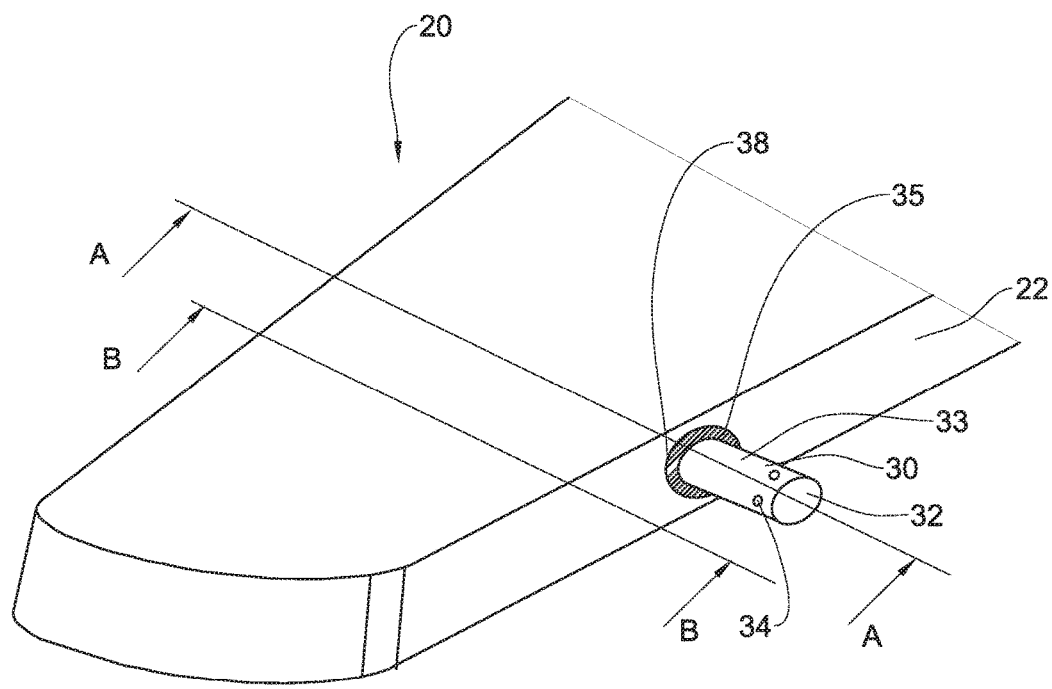
FIG. 2A illustrates an isometric view of a wing portion having an ice detecting apparatus according to an example of the presently disclosed subject matter, mounted thereon.
Figure 2B:
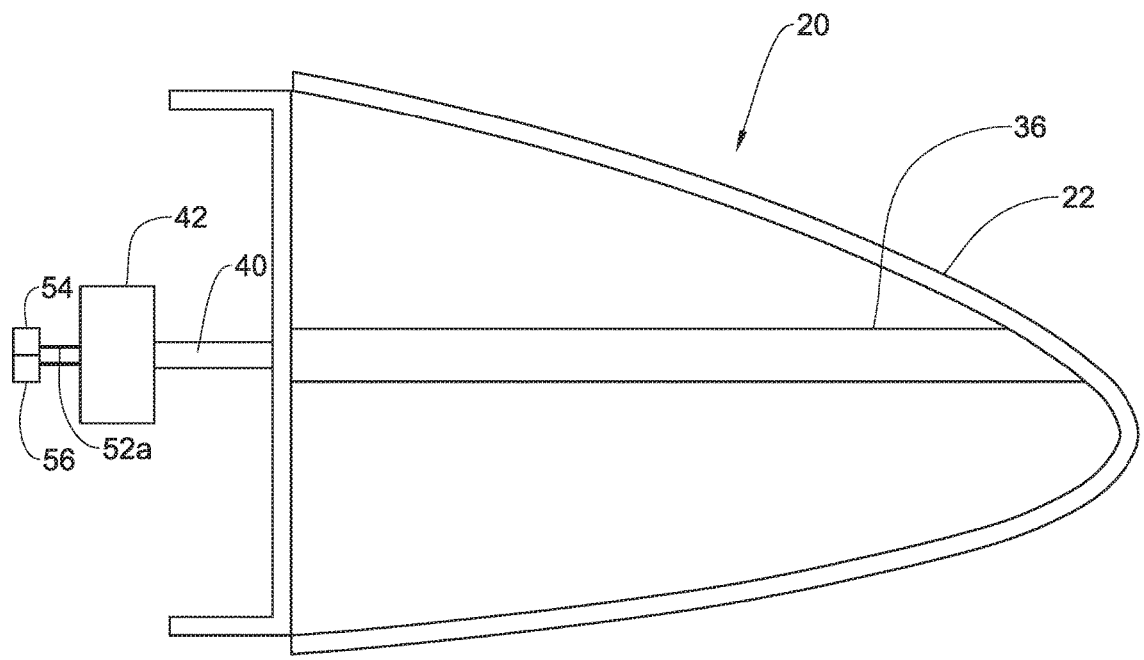
FIG. 2B illustrates a side sectional view of the wing portion of FIG. 2A taken along lines B-B.

FIG. 2A shows an isometric view of a wing portion 20 of an aircraft having an ice detecting apparatus 30 mounted thereon. The ice detecting apparatus 30 is configured to detect ice accumulation on an outer surface 22 of the wing portion 20 and includes a body 32 having ice detecting surface 33 which includes at least one ice detector 34 mounted thereon and configured to slide in and out of a channel 36 formed inside the body of the wing portion 20.

According to an example the channel 36 is a transversely defined substantially in parallel to the traveling direction of the aircraft. The channel 36 is terminated on one end thereof with an opening 38 which can be configured to face the traveling direction of the aircraft or any other direction. The ice detecting surface 33 of the body 32 is configured to selectively protrude and retract from the channel 36 through the opening 38 such that in the protruding position the ice detector 34 is disposed out of the channel 36, and that in the retracted position the ice detector 34 is disposed inside the channel. This way, in the protruding position ice accumulating about the opening 38 can be detected by the ice detector 34. The opening 38 of the channel includes a scraping member 35 so mounted relative to the body 32 and the ice detecting surface 33 as to allow scraping ice from the ice detecting surface 33 and from the ice detector 34 during the displacement of the body inside the channel 36, as is explained hereinafter in detail. According to an example, the scraping member 35 is mounted about the inner periphery of the opening 38, such that it engages the detecting surface during the displacement thereof into the channel 36. The scraping member 35 can be a ring-like member and can include a relatively sharpened portion 37 (shown in FIG. 2C) defined on the inner periphery thereof, configured to engage the detecting surface 33 and to remove ice therefrom while the body 32 is displacing in and out of the channel 36.

According to an example, the body 32 is an elongated rod 40 having an ice detector 34 mounted on a first end thereof, and on a second end thereof being coupled to an actuator 42, such as a motor, configured to allow a longitudinal displacement thereof. The body 32 is, thus, configured to be displaced to the protruding position such that the ice detecting surface 33 protrudes out of the channel 36. In the retracted position on the other hand, the body 32 is displaced into the channel 36 thereby retracting the ice detecting surface 33 and the ice detector 34 integrated therein into the channel 36.

Although in the latter example, the rod 40 constitute the body 32, according to other examples the body 32 can be mounted on a rod. The ice detector 34, according to these examples, can be mounted on the body 32, which in return can be mounted on a first end of the rod.

It is appreciated that the rod 40 can be of any size, and can extend inside the wing portion 20 as required. For instance, if the aerodynamics requirements are such which require that the wing portion 20 facing the traveling direction of the aircraft is made thin and therefore the actuator 42 cannot be disposed in the front portion of the wing, the rod 40 can be extended to an inner portion of the wing where the inner volume thereof allows disposing an actuator 42 therein.

The apparatus 30 can further include one or more guides 43 disposed inside the channel 36 and configured to facilitate the displacement of the rod 40. The guides 43 can includes pads 45 (shown in FIG. 2D) configured to facilitate sliding of the rod 40 in the channel 36.

According to the illustrated example the ice detector 34 is one or more optical fibers 52 coupled to a light source 54 and a sensor 56 on a receiving end 52a thereof and configured to transmit light emitted from the light source towards an emitting end 52b of the fiber 52. The optical fiber 52 is coupled to the body 32, which as described hereinabove can be a rod 40, such that when the apparatus 30 is in the protruding position thereof the emitting end 52b can emit light towards the ambient of the wing portion 20, for example the area adjacent the outer surface 22 thereof.

It is appreciated that other ice detectors can be used as well, and can be mounted on the body 32, such that when the apparatus 30 is in the retracted position the ice detector 34 is disposed inside the channel 36 and when in the protruding position the ice detector is disposed such that it can detect ice accumulation on the outer surface 22 of the wing 20.

Figure 3A:
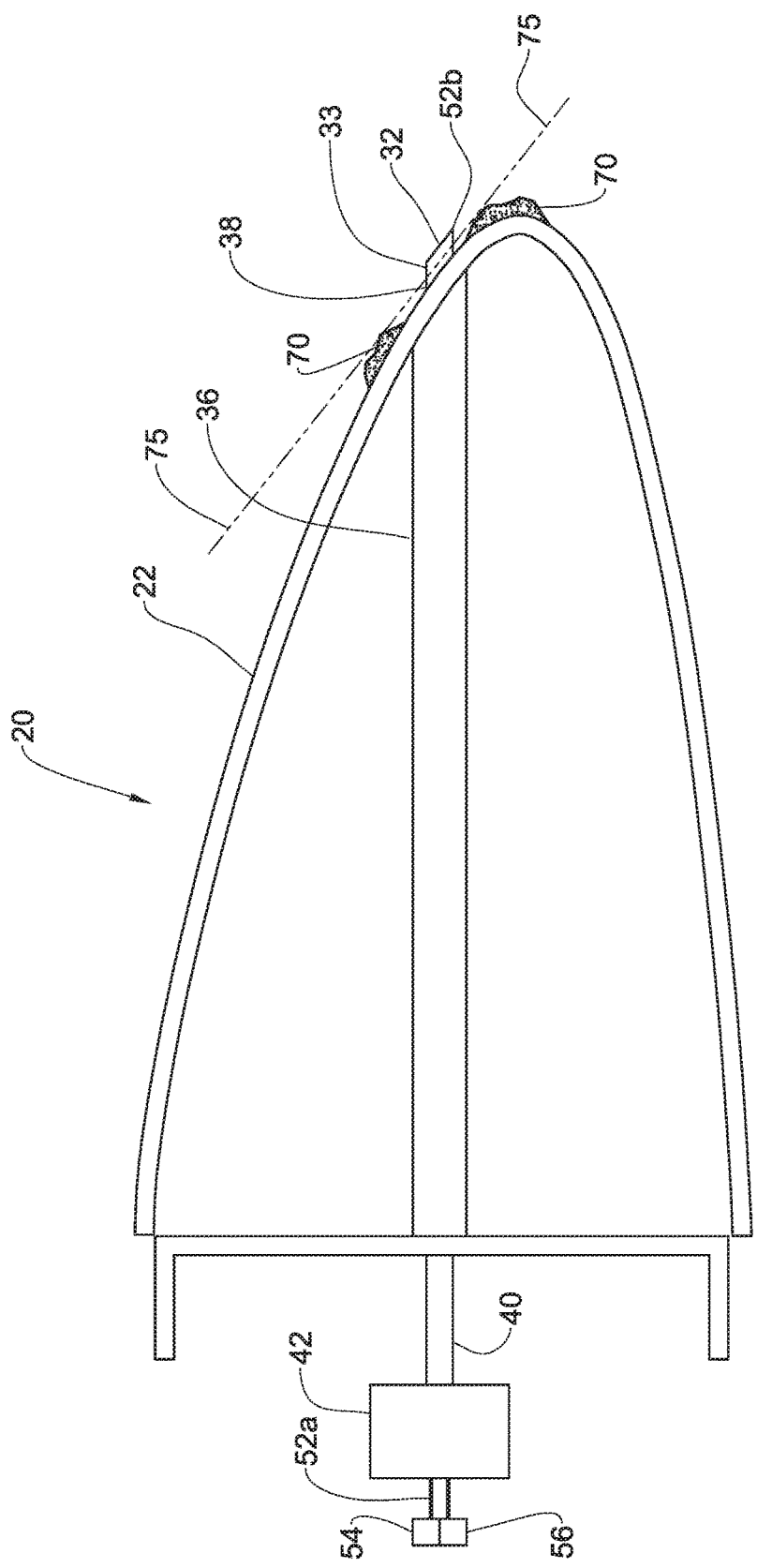
FIG. 3A illustrates a side sectional view of the wing portion of FIG. 2A taken along lines B-B in the semi-protruding position.
Figure 3B:
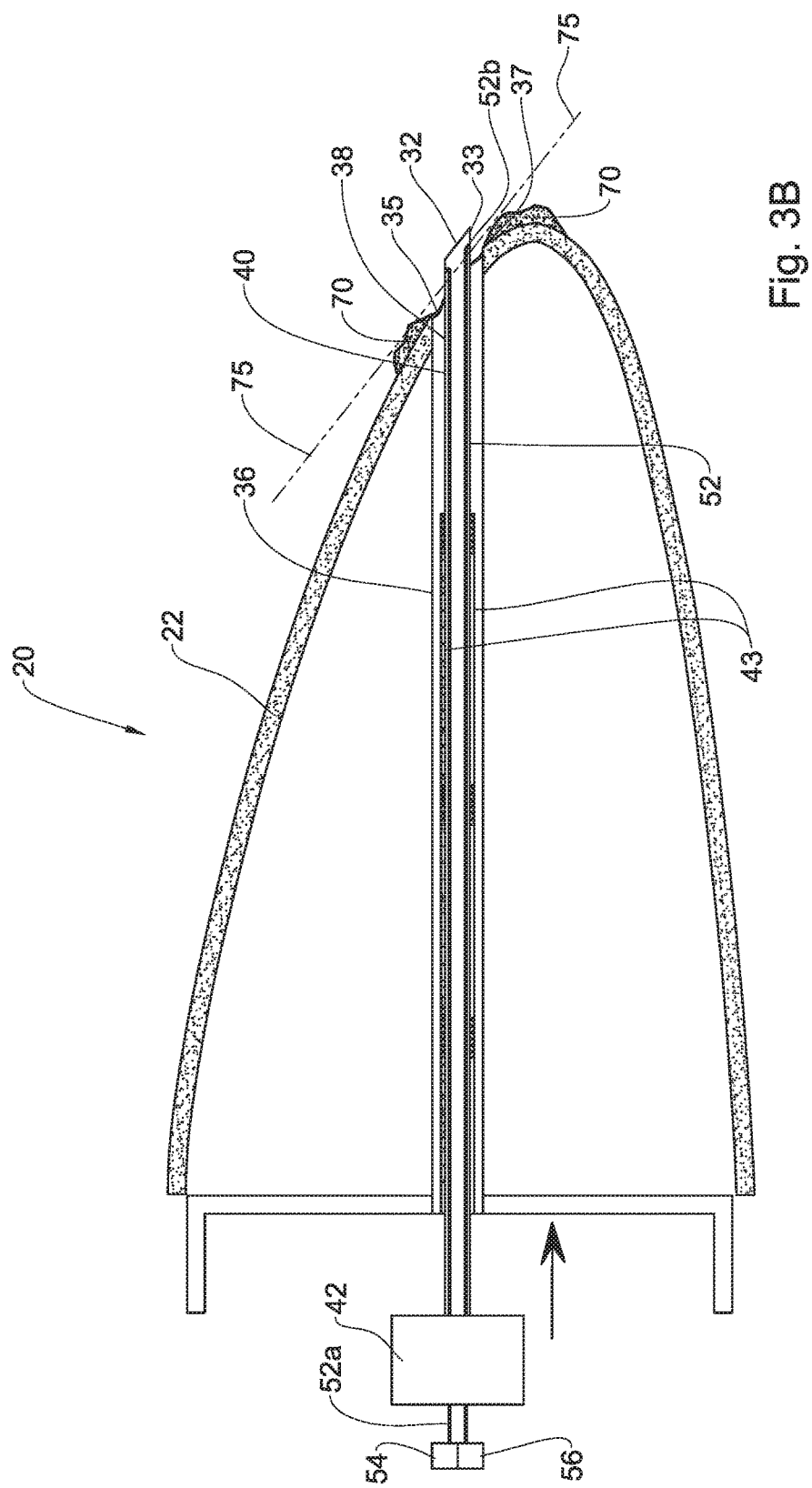
FIG. 3B illustrates a side sectional view of the wing portion of FIG. 2A taken along lines A-A in the semi-protruding position.

Referring now to FIGS. 3A and 3B, when ice accumulation is suspected the ice detecting apparatus 30 can be activated for example by shifting thereof to the protruding position. At this position the rod 40 protrudes outside the wing 20 such that the ice detector 34 can detect the presence of ice 70 on the outer surface 22 thereof. In the illustrated example, the ice detector is an optical detector configured with two optical fibers 52, the emitting end 52b thereof protrudes such that light can be emitted along a line 75 substantially in parallel to the outer surface 22. It is appreciated that the emitting end 52b of the optical fibers 52 can be directed to detect the presence of ice 70 on the outer surface 22 of the wing portion 20 thereabout by directing light to and receiving reflected light from locations on the outer surface. Alternatively, or in addition, the emitting end 52b of the optical fibers 52 can be directed to detect accumulation of ice on the body 32, for example on the detecting surface 33 by directing light to and receiving reflected light from locations on the detecting surface.

According to an example, the light is reflected back towards the ice detector 56 and is used to determine the existence of ice 70. The reflected light can be received by another optical fiber which transmits the light back to the receiving end 52a towards a sensor 56 which determines based on the characteristics of the light whether the light is reflected from a layer of ice 70 or from other elements or objects on the outer surface 22 of the wing 20. It is appreciated that according to an example a single optical fiber can be utilized for transmitting light from the light source 54 towards the emitting end 52b as well as for transmitting the reflected light back from emitting end 52b towards the light detector 56. In the latter example, the emitting end 52b of the fiber is utilized, by known methods, to emit light as well as to receive reflected light. According to this example the receiving end 52b is coupled to a module integrating the light source 54 and the sensor 56 therein.

It is appreciated that the emitting end 52b of the fibers 52 can be directed towards any location on the outer surface 22 of the wing 20, for instance location which are likely to have ice accumulation thereon.

The distance of protrusion of the emitting end 52b and the detecting surface 33 can be determined in accordance with the minimum thickness of the ice layer 70 which is to be detected. That is to say, if for example a layer of ice 70 having a thickness of 1 mm is allowed on the wing, and it is thus desired to detect ice at a distance from the outer surface 22 which is larger than 1 mm, the emitting end 52b can be configured to protrude such that light emitted therefrom can impinge on objects at least partially disposed at a 1 mm distance from the outer surface 22.

It is appreciated that the distance of protrusion can be changed in accordance with the detection requirements. Changing the protruding distance can be carried out by the pilot or can be automatically carried out, for instance depending on the flight zone, altitude, speed or other parameters.

Reference is now made to FIG. 4, according to an example, upon detection of ice, the rod 40 can be further displaced outwardly such that the detector 34 can emit light along a line 75 disposed at a distance from the outer surface 22 of the wing 20, larger than that of the line illustrated in FIG. 3A. This way, the ice detector 34 can be displaced until the full thickness of the ice layer is determined. According to another example the rod 40 can include a plurality of ice detectors, such as optical fibers, each disposed at a different location along the length thereof. This way, when the rod 40 is in the protruding position, each optical fiber can detect ice at a different distance from the outer surface 22 of the wing 20.

As shown in FIG. 5 when ice accumulates over the detecting surface 33 the ice detector is no longer usable and further accumulation of ice cannot be detected. Thus, in this position the rod 40 can be displaced to the retracted position thereof, wherein the ice detecting surface 33 and the ice detector 34, such as the emitting end 52b of the optical fibers 52, are retraced into the channel 36. At this position, the scraping member 35 mounted about the inner periphery of the opening 38 of the channel 36 engages the detecting surface 33, which according to the illustrated example is the outer surface of the end portion of the rod 40 protruding outside the wing portion 20 and which includes the emitting end 52b of the optical fibers 52. Engagement between the scraping member 35, and in particular the sharpened portion 37 thereof, during the inwardly displacement of the detecting surface 33 into the channel 36 facilitate scraping ice therefrom.

As a result, as illustrated in FIG. 6, when the rod 40 is back in its retracted position the detecting surface 33 is substantially clean of ice, and can be used again to detect the presence of ice, upon protrusion thereof outside the channel 36. Thus, the ice detecting apparatus 30 allows readily utilizing the ice detector 34 again to detect the presence of ice or the accumulation of ice thereon.

It is appreciated that according to other examples the scraping member can be a member mounted in other locations on the wing portion for example be mounted on a profile and be configured to engage the detecting surface when the latter one is displaced. According to this example, the body of the detector can be configured to displace in a direction relative to the scraping member while the detecting surface engages the latter, even without retracting into a channel as in the previous example. As a consequence of the displacements of the body while the detecting surface engages the scraping member, ice is removed from the detecting surface.

According to a further example, the body can be a fixed member having a protruding portion with a detector integrated in a detecting surface. According to this example the scraping member is a movable member so mounted relative to the body as to allow engaging the detecting surface when moving such that ice is scraped from the detecting surface during the movement. The scraping member can be for example a ring member mounted over the body of the detector and being configured with a motor and a shaft for displacing along the detecting surface, while the scraping member engages the detecting surface thereby removing ice therefrom.

It is appreciated that although the description herein above refers to an ice detector being muted on a wing portion, the ice detector of the presently disclosed subject matter can be mounted on any other portions of the aircraft such as the fuselage.

Those skilled in the art to which the presently disclosed subject matter pertains will readily appreciate that numerous changes, variations, and modifications can be made without departing from the scope of the invention, mutatis mutandis.

The invention claimed is:
1. An aircraft ice detecting apparatus, comprising:
  a body formed as an elongated rod including at least one ice detector at a first end thereof and being coupled at a second end thereof to an actuator configured to allow a longitudinal displacement thereof, said elongated rod being mounted inside a channel and configured to be selectively displaced between a protruding position in which a surface of the body protrudes out of said channel, and a retracted position in which said surface of the body is disposed inside said channel, said at least one ice detector being configured to detect ice accumulation on an exterior surface of an aircraft; and a scraping member so mounted relative to said body as to allow movement of one relative to the other and configured for scraping ice from surface of the body during said movement.

2. The aircraft ice detecting apparatus of claim 1 wherein said channel includes at least one guide disposed therein and being configured to facilitate the displacement of the elongated rod between said protruding position and said retracted position.

3. The aircraft ice detecting apparatus of claim 1 wherein said at least one ice detector includes at least one optical fiber coupled to a light source on a receiving end thereof and configured to transmit light emitted from the light source towards an emitting end thereof.

4. The ice aircraft detecting apparatus of claim 3 wherein said at least one optical fiber is mounted inside a rod mounted inside a channel and being selectively displaceable between a protruding position in which said emitting end protrudes out of said channel and a retracted position in which said emitting end is disposed inside said channel.

5. The ice aircraft detecting apparatus of claim 4 wherein said light detector further includes a receiving optical fiber having a first end configured for receiving light and a second end coupled to a light sensor.

6. The ice aircraft detecting apparatus of claim 4 wherein said emitting end is further configured for receiving light reflected from objects disposed adjacent said light detector and wherein said optical fiber is configured for transmitting said reflected light towards a light sensor coupled to said receiving end.

7. The ice aircraft detecting apparatus of claim 6 wherein said light source and said light sensor are integrated in a module coupled to said receiving end.

8. The ice aircraft detecting apparatus of claim 1 wherein said body includes a plurality of said at least one ice detectors each being disposed at a different location along the length of said body.

9. The ice aircraft detecting apparatus of claim 1 wherein said scraping member is disposed at an opening of said channel and being configured for scraping ice from said surface of the body during displacement between said protruding position and said retracted position.

10. The ice aircraft detecting apparatus of claim 1 wherein said scraping member includes a ring-like member having sharpened portion defined on an inner periphery thereof, and being configured to engage the surface of the body and to remove ice therefrom during said movement.

11. An element of an aircraft having an exterior surface susceptible to ice formation thereon, and having an ice detecting apparatus, said ice detecting apparatus comprising:
a body formed as an elongated rod including at least one ice detector at a first end thereof and being coupled at a second end thereof to an actuator configured to allow a longitudinal displacement thereof, said elongated rod being mounted inside a channel and configured to be selectively displaced between a protruding position in which a surface of the body protrudes out of said channel, and a retracted position in which said surface of the body is disposed inside said channel, said at least one ice detector being configured to detect ice accumulation on an exterior surface of an aircraft; and a scraping member so mounted relative to said body as to allow movement of one relative to the other and configured for scraping ice from said surface of the body during said movement.

12. The element of claim 11 wherein said at least one ice detector is configured to detect ice accumulation on an outer surface of said exterior surface.

13. The element of claim 11 further comprising a channel formed therein and having an opening defined on said exterior surface, and wherein said body includes an elongated rod disposed in said channel and said at least one ice detector is mounted on a first end thereof, and wherein said elongated rod is coupled on a second end thereof to an actuator configured to allow a longitudinal displacement thereof.

14. The element of claim 11 wherein said element is selected from a group including a wing portion and a fuselage portion.

15. The element of claim 11 wherein said ice detector is configured to detect said accumulation when the rod is in the protruding position.

16. The ice detecting apparatus of claim 1 wherein said ice detector is configured to detect said accumulation when the rod is in the protruding position.

* * * * *